United States Patent [19]

Schaefer

[11] Patent Number: 4,550,567
[45] Date of Patent: Nov. 5, 1985

[54] TANDEM MASTER CYLINDER FOR HYDRAULICALLY OPERATED VEHICULAR BRAKES

[75] Inventor: Ernst-Dieter Schaefer, Pliezhausen, Fed. Rep. of Germany

[73] Assignee: ITT Industries Incorporated, New York, N.Y.

[21] Appl. No.: 545,764

[22] Filed: Oct. 26, 1983

[30] Foreign Application Priority Data

Nov. 12, 1982 [DE] Fed. Rep. of Germany ....... 3241881

[51] Int. Cl.⁴ ............................................. B60T 11/20
[52] U.S. Cl. ........................................ 60/562; 60/589
[58] Field of Search .................... 60/589, 562, 592

[56] References Cited

U.S. PATENT DOCUMENTS

| | | | |
|---|---|---|---|
| 2,332,301 | 10/1943 | Cox | 60/589 |
| 3,557,555 | 1/1971 | Wilson | 60/589 |
| 4,132,073 | 1/1979 | Ewald | 60/589 |
| 4,267,697 | 5/1981 | Hodkinson | 60/589 |
| 4,313,302 | 2/1982 | Farr | 60/589 |
| 4,329,846 | 5/1982 | Gaiser | 60/589 |
| 4,330,995 | 5/1982 | Miyakawa | 60/589 |
| 4,419,862 | 12/1983 | Farr | 60/562 |
| 4,441,320 | 4/1984 | Gaiser | 60/589 |

FOREIGN PATENT DOCUMENTS 1571663  5/1969  France .
1026249  4/1966  United Kingdom ................ 60/562

Primary Examiner—Abraham Hershkovitz
Attorney, Agent, or Firm—James B. Raden

[57] ABSTRACT

A tandem master cylinder which has a compensating bore in communication with a chamber on the rear side of the master piston. The bore is provided in the front wall of master cylinder piston and is adapted to be closed by means of valve body movable relative to said master cylinder piston. The valve body is provided on the end of a central clamping element interconnecting the two spring retainers of a piston restoring spring of master cylinder piston. The valve body is urged against compensating bore as soon as the piston restoring spring is loaded. In order to maintain a predetermined filling pressure in the chamber behind the master cylinder piston and in the output position of the piston in pressure chamber, the piston restoring spring is supported on a spring retainer that is held through a stop on the cylinder housing.

3 Claims, 1 Drawing Figure

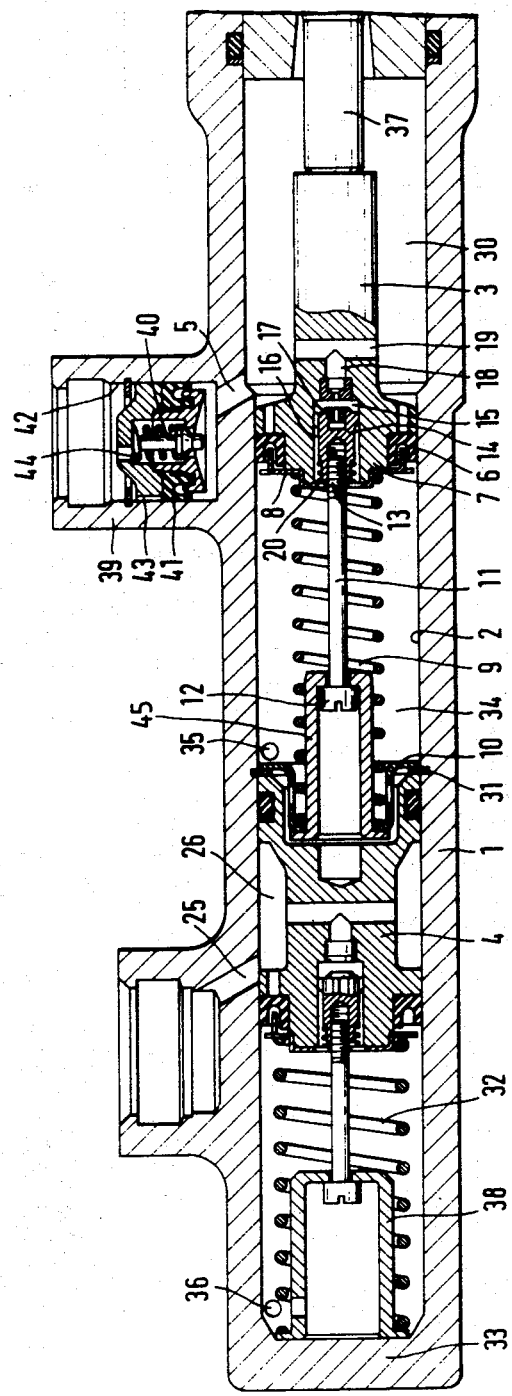

TANDEM MASTER CYLINDER FOR HYDRAULICALLY OPERATED VEHICULAR BRAKES

BACKGROUND OF THE INVENTION

The present invention is concerned with a tandem master cylinder for use with hydraulically operated vehicular brakes. There is at least one master cylinder piston including a piston restoring spring fixed by a central clamping element and a valve body displaceable relative to said master cylinder piston. The valve body opens a compensating bore on said master cylinder piston. The clamping element for the piston restoring spring on its end facing said master cyinder piston carries the valve body which, in the resting position, is a small distance ahead of said compensating bore in the front wall of said master cylinder piston. The clamping element holds the valve body in the at rest position of said master cylinder piston within the bore opening.

In hydraulically operated vehicular brakes, provision has to be made for the amount of hydraulic fluid contained in the pressure chamber of said master cylinder so that the entire brake system can be automatically refilled from the supply reservoir, if so required. In that respect, it is generally known to provide in the cylinder wall, directly ahead of the master cylinder piston, in the resting position thereof, a compensating bore via which the pressure chamber of the master cylinder, in the resting position, is in communication with the supply reservoir. This will safeguard the supply of brake fluid; moreover, it will permit equalization of pressure between the brake system and the supply reservoir, e.g. in case of an expansion of the brake fluid in the brake system when heated. Upon actuation of the master cylinder piston, the piston closes the compensating bore at the beginning of the piston stroke so that the pressure build-up required for a braking operation can take place in the brake system.

The port of said compensating bore into the cylinder interior produces an interruption of the smooth cylinder running surface over which the piston seal will have to move upon each stroke of the master cylinder piston. This may cause a strain on the piston seal.

To avoid an interruption of the cylinder running surface swept over by the piston seal, it has previously been attempted to replace the compensating bore provided in the cylinder wall, with a compensating port in the master cylinder piston, that is closed by a valve body upon actuation of the master cylinder piston.

In such a prior art construction (FR-PS No. 1 571 663), the master cylinder piston includes a central compensating bore. The valve body closing the said compensating bore is formed at the front end of a piston actuating rod which, relative to the master cylinder piston, is axially displaceable by a small distance. The small but unavoidable distance produces undesirable play in the actuation of the brake. The restoring spring required for the retraction movement of the master cylinder piston does not engage the master cylinder piston as such but rather the piston actuating rod. It is not positive that the compensating bore upon relief of the piston be released in due course thus causing the risk that at least a temporary vacuum will arise in the brake likely to result in a penetration of air into the master cylinder.

SUMMARY OF THE INVENTION

It is an object of the present invention to provide a tandem master cylinder of the aforementioned type which, although of a comparatively simple construction, is so designed that no idle stroke of the master cylinder piston occurs and the pressure chambers required for the pressure build-up, in the resting position, are under a predetermined initial pressure.

This object will be achieved according to the invention in that the piston restoring spring is supported on a spring retainer held by a stationary stop on the cylinder housing to prevent displacement in the direction of actuation.

Advantageously, the spring retainer for supporting the piston restoring spring includes a central bore through which the stop sleeve extends and is fixed to the clamping element and is supported on the front side of the intermediate piston.

In order to safeguard that a predetermined filling pressure prevails in the chamber behind the master cylinder piston in the starting position thereof, according to an embodiment of the invention, a valve is provided in the intake channel connecting the pressure fluid supply reservoir to the space behind the master cylinder piston, the valve body of which—applied to which is a spring—if formed as a check valve permitting the return of the pressure fluid from the chamber behind the master cylinder piston to the pressure fluid reservoir after the filling pressure has been exceeded.

Preferably, the intake of pressure fluid from the supply reservoir via the intake channel into the space behind the master cylinder piston is performed via a passageway or groove provided in which there is a valve, e.g. a sealing collar, opening the passageway under atmospheric pressure to automatically offset a pressure fluid loss possibly occurring in the brake circuit in the starting position of the master cylinder piston.

The invention permits various forms of embodiment one of which is illustrated in the accompanying drawing showing a longitudinal section through a tandem master cylinder.

DETAILED DESCRIPTION

The tandem master cylinder illustrated in detail in the drawing, includes a cylinder housing 1 having a cylinder bore 2 in which a master cylinder piston 3 and an intermediate piston 4 are guided in sealingly displaceable manner. Intake channels 5 and 25 from a supply reservoir terminate respectively in chambers 30 and 26 disposed behind master cylinder piston 3 and intermediate piston 4, respectively, both chambers being sealed toward the right (in the direction of the piston rod). As the intermediate piston 4 with the appertaining parts thereof is of a configuration similar to that of master cylinder piston 3, reference will be made to master cylinder piston 3 only in the ensuing explanation.

Master cylinder piston 3 carries a primary collar 6 formed as a sealing ring, surrounding a cylindrical section 7 of master cylinder piston 3, projecting from the front side (left side in the drawing). Supported on section 7 is a spring retainer 8 of a piston restoring spring 9 formed as a compression spring which at the other end is in abutment with a spring retainer 10. The piston restoring spring 9 is fixed in place by a rod-shaped central clamping element 11 extending in axially movable manner through spring retainers 8 and 10, the element 11 having a head 12 supported by sleeve 45 and a valve body 14, respectively. The threaded foot 13 of clamping element 11 is connected to a valve body 14 which in turn protrudes into a frontsided central bore 15 of main cylinder piston 3 and being guided there by leaving lateral passageways 16. Valve body 14 carries a central seal 17 axially disposed a small distance ahead of a central compensating bore 18 in master cylinder piston 3 so that a lateral bore 19 is in communication with chamber 30 disposed behind master cylinder piston 3 and, hence, with intake bore 5. The outer diameter of seal 17 is flush against the front face of valve body 14 and is larger than the diameter of compensating bore 18. A compression spring 20 serves as a valve closing spring between valve body 14 and spring retainer 8 provided on the piston side.

In the drawing, master cylinder piston 3 is shown in its resting position. As master cylinder piston 3 is moved to the left through an actuating force acting from the right through rod 37 in cylinder bore 2, the spring retainer 10 of piston restoring spring 9 is supported on stop 31 stationarily provided on the housing while restoring spring 32 of intermediate piston 4 is supported by hood-shaped stop sleeve 38 on end 33 of cylinder bore 2, on cylinder housing 1.

During actuation of the master cylinder, first the piston restoring spring 9 is compressed by a minor amount. At the same time, clamping element 11 is axially released so that valve closing spring 20 displaces valve body 14 relative to master cylinder piston 3 until compensating bore 18 is closed by valve body 14. As of that point in time, pressure is being built up in known manner in the pressure chamber 34 provided between said master cylinder piston 3 and said intermediate piston 4; that pressure is transferred to a brake circuit connected at 35 while the pressure building up ahead of intermediate piston 4, is transferred to said second brake circuit connected at 36.

As master cylinder piston 3 returns into its starting position, valve body 14 is lifted off said compensating bore 18 as soon as the piston restoring spring 9 is relieved, i.e. as soon as the clamping element 11 transfers tractive force between the said two spring retainers 8 and 10 that is in excess of the spring force of said valve closing spring 20.

A special advantage arising from the afore-described tandem master cylinder resides in that the pressure contained in chamber 30 is transferrable to said pressure chamber 34, with valve body 14 not closing the pressure fluid passageways through compensating bore 18. The reason for this is that the piston restoring spring 9 is supported by a spring retainer 10 stationarily held by a stop means 31 on cylinder housing 1. It is only upon movement to the left of said master cylinder piston 3 as a result of the actuation of rod 37 that compression spring 20 is relieved and clamping element 11 permits valve body 14 to close compensating bore 18 through central seal 17. A displacement of intermediate piston 4 to the left possibly taking place upon a pressure rise in chamber 30 and in pressure chamber 34, respectively, has no bearing on the movement of valve body 14 with central seal 17 thereof.

The pressure prevailing in chamber 30 is dependent on the change-over pressure valve disposed in connection 39 formed as a check valve having a spring-loaded valve body 40. Upon movement of master cylinder piston 3 in the direction of actuation, the volume of chamber 30 is enlarged so as to permit intake of pressure fluid into chamber 30 (depending on the layout of lip-shaped seal 41) via groove 43 and intake channel 5. As master cylinder piston 3 moves back into its starting position, part of the pressure fluid via check valve 40, 44 can flow back into the pressure fluid reservoir as soon as the desired change-over pressure has been reached.

What is claimed is:

1. A tandem master cylinder for use in a hydraulically operated brake system for a vehicle in which said cylinder comprises a housing having an elongated axial bore therein, a master cylinder piston and an intermediate piston axially aligned in said bore and spaced within said housing,
    an individual restoring spring for each piston, each such spring at one end bearing against one face of the respective piston, an individual spring support for the opposite end of each spring secured in a fixed axial location to said housing,
    a valve mechanism in the one face of each piston for providing a communication therethrough to an output chamber adjacent the one face of the respective piston within said bore with its respective piston in its at rest condition, each valve mechanism including a valve seat in the respective piston and a displaceable valve body,
    an individual clamping element for positioning and aligning each restoring spring with each clamping element affixed to and carrying the respective valve body of the mechanism in the one face of the respective piston,
    each said clamping element engaging the spring support for the respective spring to position the valve body carried by that clamping element relative to the fixed axial location on the housing to prevent displacement of each valve body from its at rest position at less than predetermined operating pressures in the respective output chambers of said cylinder bore, and
    wherein said spring support for supporting said master piston restoring spring includes a central bore through which a stop sleeve extends fixed to said master piston clamping element and supported on the one face of said intermediate piston.

2. A master cylinder according to claim 1, wherein there is a channel valve mounted into an intake channel of said cylinder connecting a pressure fluid reservoir to a chamber behind said master cylinder piston, the body of said channel valve being formed as a check valve permitting the return of the pressure fluid from the chamber behind said master cylinder piston to the pressure fluid reservoir after a filling pressure of the chamber is exceeded.

3. A master cylinder according to claim 2 in which the intake of the pressure fluid from the supply reservoir via the intake channel into the chamber behind said master cylinder piston takes place via a passageway or a groove in which there is provided a valve in the form of a seal collar permitting the intake of the pressure fluid from the pressure fluid supply reservoir to the chamber behind said master cylinder piston at atmospheric pressure.

* * * * *